United States Patent [19]

Hold et al.

[11] 4,311,446
[45] * Jan. 19, 1982

[54] INJECTION MOLDING MACHINE CONTROLS

[75] Inventors: Peter Hold; Angelo J. Notte, both of Milford; Marc A. Rizzi, Orange, all of Conn.

[73] Assignee: USM Corporation, Farmington, Conn.

[*] Notice: The portion of the term of this patent subsequent to Mar. 11, 1992, has been disclaimed.

[21] Appl. No.: 457,327

[22] Filed: Apr. 3, 1974

Related U.S. Application Data

[60] Division of Ser. No. 435,347, Jan. 21, 1974, Pat. No. 3,870,445, which is a continuation of Ser. No. 326,887, Jan. 26, 1973, abandoned, which is a division of Ser. No. 194,280, Nov. 1, 1971, abandoned.

[51] Int. Cl.³ .............................................. B29F 1/06
[52] U.S. Cl. ..................................... 425/144; 425/145
[58] Field of Search ...................... 425/144, 145, 143

[56] References Cited

U.S. PATENT DOCUMENTS

| | | | |
|---|---|---|---|
| 3,492,700 | 2/1970 | Kornmayer | 425/145 |
| 3,642,402 | 2/1972 | Hutchinson et al. | 425/144 |
| 3,870,445 | 3/1975 | Hold et al. | 425/144 |

Primary Examiner—William R. Briggs
Attorney, Agent, or Firm—William F. White

[57] ABSTRACT

Method and apparatus for controlling the parameters of injection molding processes in a machine having a barrel with a plasticating chamber and a screw, rotatably and slidably disposed in said chamber, hopper means adjacent one end of said chamber communicating therewith and nozzle means disposed in the other end of said chamber communicating with a mold. Control of the injection molding process is achieved through an event recognition philosophy by sensing screw position, screw injection velocity, melt temperature, comparing the values at certain instances during the work cycle with known or desired values and using these values, changes of values and differences of values to monitor and initiate changes in the process parameters.

4 Claims, 7 Drawing Figures

INJECTION MOLDING MACHINE CONTROLS

This is a division of Ser. No. 435,347, filed Jan. 21, 1974, now U.S. Pat. No. 3,870,445 which is a continuation of Ser. No. 326,887 filed Jan. 26, 1973 abandoned, which is a division of Ser. No. 194,280, filed Nov. 1, 1971 abandoned.

BACKGROUND OF THE INVENTION

This invention relates to advanced control systems for injection molding such as supplied by the Farrel Company, Division of USMCorporation, Ansonia, Conn. These controls may be said to be extensions of conventional control system concepts. In this regard, conventionally, a number of direct process variables such as melt temperature and shot volume are adjusted indirectly by manipulating or adjusting the various direct machine controls such as position limit switches, speed regulators, and timing devices which may be directly mounted upon the machine to effect these variables. Other direct process variables such as shot holding time and in mold time are conventionally controlled by timer without being controlled positively in direct relation to specific events within the injection process. In the advanced control system subsequently described, conventional machine sensors and actuators affecting the various events in the total process have been repositioned, replaced and supplemented, and the machine controls have been sequentially readjusted and made interresponsive to provide an overall control of the injection molding procedure not previously available.

Among the overall objectives of the control system, the advance control system is to control certain key process variables individually, or directly, by individually sensing the process parameters and generating appropriate feed-back signals, and then using these signals to initiate or perform the specific control task for adjustment of the process. This, to a large extent, enables the usual machine process control decisions to be taken out of the hands of manual operators and provides a system which produces an acceptable product under semi-automated and varied operating conditions. The advanced control system contemplated herein may be broken down into several subsystems performing individual or localized process control functions; and among these are melt temperature control, shot volume control and various monitoring of "remote" control process variables.

The present invention relates in general to method and apparatus for controlling the plasticating of polymeric materials in injection molding processes. More specifically, this invention relates to (1) control of the heat energy supplied to or generated within the plasticating apparatus for melting and plasticating the material; (2) control of the quantity of plastic material subsequently injected into a mold associated with the machine; (3) sequential and quantitive control of the various pressures exerted on the plastic material during the injection process; and (4) the flexibility to provide coordinated adjustment of all of the above in response to product evaluation signals when direct input of these values is available.

The specific invention disclosed herein relates to the integrated control of the temperature of the barrel of the plasticator within which the polymeric material is being melted and mixed, in conjunction with the control of the rotational speed and back pressure of the plasticating screw within the apparatus which performs the actual plasticating function. The specific invention disclosed also relates to control of the stroke of the plasticating screw so that it will, first, draw back during mixing to a position providing exactly the shot volume desired, secondly, inject the charge at the desired velocity or pressure, thirdly, sequentially shift through the various pressures necessary to fill, pack and cure the material in the mold, and finally repeat the sequence.

It has been recognized that the plastic materials used in the injection molding processes today often require that the melt temperature be accurately controlled in order to carry out the injection molding process effectively. If the plastic material is either below or above the required temperatures the material may be incompletely plasticated or it may become discolored or otherwise deteriorated before or during injection molding procedure.

A further complication in the control of the temperature of polymeric material being plasticated is that the rate of heat transfer through the material is quite low and efforts to supply make-up heat from external sources such as through direct heating of the barrel or plasticating chamber tend to cause the material to deteriorate in the area of the interface between the material and the barrel itself at a time long before substantial heat has been conducted into the more central portions of the plasticating mass.

No controls existed prior to our invention to adjust and insure proper temperature of the melted, plasticated mass and to insure effective injection by a straightforward, sequential event-related approach. In many of the conventional plasticating and injection molding apparatus, the actual temperature of the mass injected is not measured or coordinatedly controlled during the continuing, repeated steps of the injection molding process. Much of the effort of control has been directed to a trial and error approach, finding acceptable values and then running a machine with these set values, with no provision for feed-back signals to check the set values. Specifically, these methods often only employ nominal temperature correction subsequent to the molding process consistent with visual observations of ineffective molding such as the aforementioned color changes or other material deterioration or the improper filling of a mold or other visible indications of unmixed or poorly mixed injection materials.

While these conventional machines have been somewhat satisfactory for manual operation on relatively low volume bases, the control methods employed therein have been totally unsatisfactory for high speed automatic molding machines. More particularly, the conventional control approaches would be totally unsatisfactory for a coordinated computer controlled machine which would be capable of detecting the individual imperfections in the molding process and product and making the appropriate on line corrections and adjustments in the process to effect a satisfactorily molded product.

Resolution of the shot to shot problems involved in control of the melt temperature, however, do not individually provide the necessary speed of production in control over the production process to bring about the economy, efficiency and quality of production necessary for automated, high speed production. That aspect of the system should be coupled to responsive event control of shot volume and a continuing monitor/control of the injection stroke of the plasticating screw.

Conventional methods of controlling the volume of material injected into a mold by an injection molding machine include various timing means, position limit switches and position control switches influencing the screw backstroke to control the amount of polymeric material collected within the mixing chamber and then injected into the mold. It should be recognized that these conventional controls systems utilize input commands which are not indicative of the particular process parameters, or true events of the process. These conventional controls merely initiate step-by-step functions set by trial and error. By such conventional control systems the various process pressures and flow rates developed within the system are controlled by manual adjustment of relief valves and flow control valves, timing devices and the like.

Such open loop control systems do not lend themselves readily to fully automatic control systems wherein the particular processes performed are controlled in response to deviations from the particular desired process parameters. Some attempts at semi-automation have been made by setting or adjusting these otherwise manually controlled devices by means of a punch card system which inputs certain commands into the process machine in certain desired sequences. These "refined" systems however are based on operator controlled systems inputting changes to the mentioned limit switches or time functions and not the actual process control, thereby effecting process operation by predetermined commands unresponsive to existing conditions.

While these conventional machines have been somewhat satisfactory for operation on relatively low volume basis, the control methods employed therein are totally unsatisfactory for a high-speed, fully automated molding machine. More particularly, the conventional control approaches would be totally unsatisfactory for a computer controlled machine including sensors capable of detecting the imperfections in its molding processes and products, and making appropriate corrections by adjustments in the particular process parameters which make up the molding process.

The present invention, then, relates to method and apparatus for incrementally adjusting the temperature generated within one charge of the injection molding process, by coordinatedly controlling the speed of rotation of the screw, the back pressure of the screw and the barrel temperature of the plasticating chamber. In coordination with this, the invention includes method and apparatus for continually controlling the volume of the shot injected into the mold in the machine, and in addition the coordinated control of the sequential injection stroke of the screw according to the pressure and velocity patterns of the melt and screw during the injection process.

The foregoing objects, features and advantages of the present invention will become more clearly apparent from the following detailed description such as to be read with reference to the accompanying drawings.

SUMMARY OF THE INVENTION

Method and apparatus for controlling the parameters of injection molding processes in a machine having a barrel with a plasticating chamber and a screw, rotatably and slidably disposed in said chamber, hopper means adjacent one end of said chamber communicating therewith and nozzle means disposed in the other end of said chamber communicating with a mold. The general work cycle of such machine includes introducing polymeric material into said chamber through said hopper, rotating said screw to plasticate said material during which the screw is retracted in said chamber, and injecting the plasticated material into the mold through the nozzle by a forward or injection thrust of the screw. Control of the injection molding process is achieved through an event recognition philosophy by sensing screw position, screw injection velocity, melt temperature, comparing of values at certain instances during the work cycle with known or desired values and using these values, changes of values and differences of values to monitor and initiate changes in the process parameters.

DESCRIPTION OF THE PREFERRED EMBODIMENT

The subsequent description relates to a new family of control systems for injection molding machines. As subsequently discloed, a family ultimately consists of three members. The basic control system (FBC), the process control system (FPC) and preferably the multivariable computer control system (FMC), all of which are closely related. By coupling the second member of the system to the first member and subsequently the third member to the group of the first two members, the resultant systems demonstrate increasing degrees of sophistication which exhibit an increasing independence from the human factor.

The basic control system which will subsequently be described, by and large follows a control strategy similar to today's conventional injection molding machine control systems. It will be pointed out however that this conventional strategy is uniquely implemented by virtue of the new understanding of injection molding process control and the particular combinations of sensors and systems employed to direct the various modes of the injection molding process. The basic control system is particularly adapted to perform with the process conrol (FPC).

The overall objective of the process control, (FPC), is to maintain the quality of the molded part independent of disturbances and variations in the injection molding environment once the primary operator has established the various control settings for the modes of injection molding. This objective is achieved by either introducing changes into the process variables which have deviated from the original set values or by warning the basic operator giving an indication of the process parameter which has deviated from the original setting, and which previously resulted in an acceptably molded part.

The process control (FPC) as subsequently described includes five subsystems which may be variously selected and combined to provide certain injection molding mode controls. Specific description of the subsystems and their interrelation with each other and the process control system in its entirety will be subsequently discussed.

The multivariable computer control system (FMC) is a future development which will be compatible with the two previously mentioned systems, the FBC and the FPC, as a means of eliminating decision making by a human operator. It is anticipated that upon development of an automated inspection system capable of viewing a molded part and feeding back notations of defects or imperfections therein, the FMC may completely eliminate in-process human inputs. The FMC closes the control loop around the product. In absence of automated inspection, the results of human inspection may be reported to a computer. Using a multivariable control strategy, presently being developed, the computer may determine the necessary changes to the set points of the various control variables to produce a part with qualities conforming to the input specifications. The computer control system in its preferred form would interface directly with the injection molding machine control through the process control system FPC. The FMC would have the capacity to relate imperfections in a molded product to needed changes in the controllable process parameters. Calibrated voltages may be generated to direct changes in parameters and fed directly to the FPC which would incorporate the changes into the process.

The software upon which the FMC system is to be based is, in effect, a translation of the human thinking process into the domain of mathematics. The system normally starts out as an unskilled operator but by memorizing its experience it gradually becomes a skilled operator. Because of its consistency (given response for given input) and a tremendous memory even in the unskilled phase, the FMC should clearly outperform any human operator.

Figure 1:
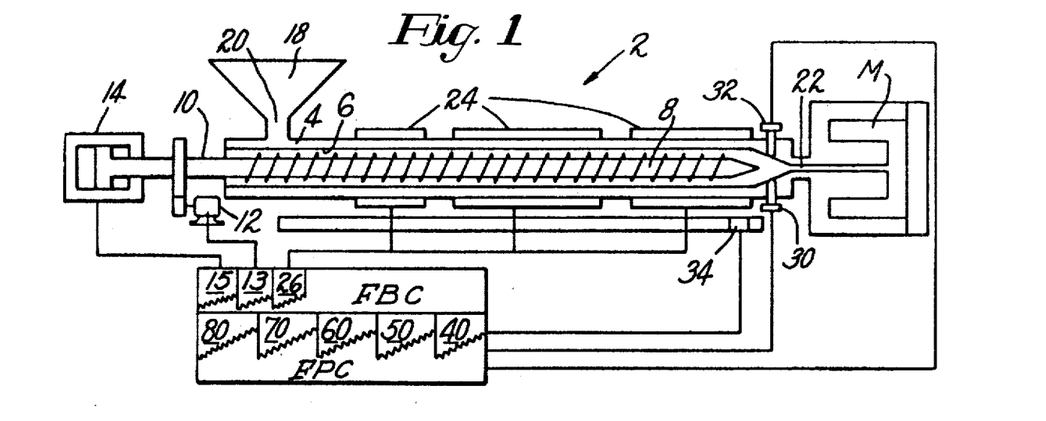
FIG. 1 is a diagrammatic presentation of the injection molding machine and control therefor, in accordance with the invention.

Referring now to the drawings in general, and to FIG. 1 in particular, the FBC controls of an injection molding machine, indicated generally by reference numeral 2, adapted to be mated with the more advanced control systems FPC and FMC (not shown). Machine 2 includes a barrel 4 with a plasticating chamber 6 axially therein. Disposed within chamber 6 is plasticating screw 8 rotatably and slidably mounted therein. The screw 8 is connected to a shaft 10 coupled to a source of rotary motion 12 and basic control 13 therefore generally indicated as a block on the diagram but understood to be means such as an electric or hydraulic motor, well known in the art. Also connected to shaft 10 is means 14 also generally indicated in block form and understood to comprise conventional screw back pressure motor means and basic control 15 therefore.

Attached to barrel 4 is a feed hopper 18 generally communicating with chamber 6 to a feed orifice 20. Hopper 18 is conventionally disposed at the rearward portion of barrel 4 and chamber 6. At the forward end barrel 4 and chamber 6 is a nozzle 22 communicating generally with the injection mold M. Surrounding barrel 4 are heaters at 24 preferably in a plurality and individually controllable so that the varying amounts or degrees of heat may be supplied along the length of barrel 4.

Disposed in the forward end of barrel 4 is temperature sensing means such as temperature transducer 30, the sensing portion of which projects into chamber 6 generally in the nozzle area to accurately measure the temperature of the mass being plasticated within said chambers. Transducer 30 is also proximate nozzle 22 in the preferred embodiment so that the frictional effect upon the material flowing through nozzle 22 during the injection stroke is also sensed. In the preferred embodiment the temperature transducer 30 provides a calibrated voltage signal directly proportional to the melt temperature.

Also communicating with the melt chamber 6 is pressure transudcer 32 which is capable of supplying a calibrating voltage indicative of the pressure existing within the plasticated mass at chamber 6 during the injection cycle. Injection molding machine 2 is also equipped with a ram position transducer 34 capable of supplying a calibrated voltage indicative of the screw position. The output from position transducer 34 also includes a second calibrated voltage signal indicative of a velocity or speed of the screw, as shown in the preferred embodiment.

Conventional injection molding machines frequently used mechanical limit switches to sense clamp and injection positions as various points in the cycle. The FBC utilizes electrical position sensors capable of producing voltage indications of the various control functions at which they monitor. In such a manner the position of a switch or clamp may supply a voltage indicative of the position thereof so that this information may be directly fed back to the more advanced control systems subsequently discussed.

Likewise, in the elements in the FBC system for controlling the basic functions of injection molding, the hydraulic pressure relief valves are the electro-hydraulic type. Therefore, such machine parameters such as injection pressures both high and hold and back pressures as well as clamp pressures may be set by calibrated potentiometers which are an integral part of the basic pressure related valves control circuit. In adapting a conventional injection molding machine to the FBC type control system, the conventional manual flow control valves are replaced by servo valves which are used in conjunction with variable displacement pumps occurring within the back pressure means 16 and screw speed means 14. This substitution provides pressures and speeds which are accurately commanded and known at all times due to the precise linearity between the command signal and function which are characteristics of these types of controls. As with the position set points the pressures and speeds may be modified electrically.

The specific control items above mentioned such as servo valves, electro-hydraulic pressure release valves and electrical position sensors are well known in the art and readily available from controls equipment suppliers. Such controls are adapted to the conventional injection molding machine such as is illustrated in FIG. 1 to adapt it to be compatible with the control systems subsequently described. These control elements are presently used with coordinating systems capable of generating calibrated electrical voltages to direct the function of these electric control elements such as the PM-1000 control available from the General Electric Company.

In the FBC all timing functions are performed by electrical circuits as compared to conventional non-electrical timing devices. Such devices are also widely known and readily available from various controls suppliers. These timers are used in the usual process molds included for timing mold cure, cycle delay, injection hold times by way of illustration. In using such electrical timing devices the usually included potentiometer means allows adjustment of the time constant for calibration of the device to meet the exact timing need or voltage output requirement.

Since the basic process controls are electro-responsive, the various individual functions performed or indicated thereby are conveniently adapted to include alarm functions. Thus high and low limit lights, alarm bells or other well known limit indications may be conveniently incorporated.

Process Control System—The process control system FPC is a second generation control system which may be coupled directly to the basic control system FBC to perform a true process control function in the form of manipulating certain key process variables. The FPC through the various inputs of sensors and individual mode controls of the FBC may, in turn, direct the function of the various modes of the FBC. The FPC may thus monitor and readjust the process variables such that the ultimate molded parts are of a constant property. In the preferred embodiment subsequently described there are five identifiable subsystems which provide various modes of process control. These are: (1) velocity range monitor, (2) melt temperature control, (3) shot volume control, (4) pressure monitor and (5) melt temperature monitor.

It will be appreciated in subsequent portions of the specification that the controls are represented in block (functional) form as the basic building elements familiar to controls engineers and that the specific control elements are available from any one of a number of controls suppliers given the described sequence and function. As subsequently presented, the control system FPC is illustrated as an electro-mechanical composite of functional sensors, actuators, comparators, etc. The illustrative system is interdependent upon calibrated voltages generated by various elements within the system. Certain process parameters are input to the control by means of "set points", as subsequently described. Within the context of the present application, the set point may include a potentiometer or variable voltage device included in a voltage responsive circuit, wherein the device provides a calibrated voltage responsive of the set point of the control knob, or the like. The presently disclosed system is adapted to cooperate with the General Electric Company PM-1000 basic injection molding machine process controller operating as an integral portion of the FBC.

Velocity Range Monitor—The velocity range monitor 40 serves as a coordinator for the other subsystems within the FPC group. As may be seen from FIG. 2, monitor 40 receives inputs from the other subsystems and, in turn, delivers outputs to many of these. The monitor serves to sequence the operation of subsystems where several respond to particular process event keyed from the position or velocity of screw 6.

Figure 2:
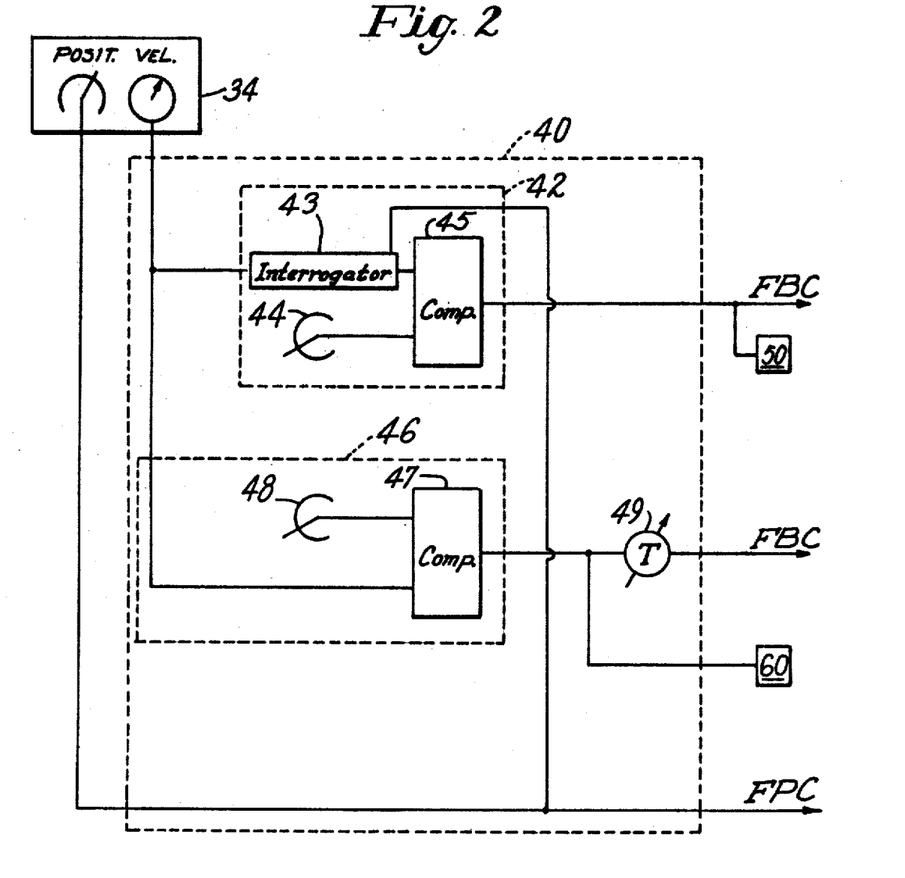
FIG. 2 is a functional diagram of the velocity monitor control of the invention.

Referring now to FIG. 2, a block diagram of the functional elements of the velocity range monitor 40 are shown. Monitor 40 receives both position and velocity inputs from position transducer 34. Transducer 34 may conveniently be a linear potentiometer with a tachometer device incorporated. A velocity input goes first to injection hold pressure control section 42. Section 42 includes as interrogator circuit 43, a velocity threshold set point 44, and a comparator 45. A position signal is also supplied interrogator 43 from transducer 34. The output of comparator 45 is a voltage signal to the FBC (back pressure motor control 15) to instruct the shift from high injection pressure to hold pressure. This signal is also supplied to the melt temperature control 50, subsequently described, to initiate a sample of melt temperature.

A second ("zero" velocity) section 46 includes a comparator 47 and a "zero" velocity set point 48. In response to its inputs, comparator 47 supplies a signal, preferably through a hold pressure timer 49 to the FBC, (back pressure control 15 generally) to initiate switch off of hold pressure and to initiate recharge of the chamber 6 and screw 8, and to the FPC, (shot volume control 80), as subsequently described.

In operation, the screw injection velocity is supplied to interrogator 43. When the velocity reaches a "threshhold" level, as set at 44 and compared at 45, an output signal is generated as indicated, to the FBC section 15 controlling the screw 6 injection stroke, and to the FPC, melt temperature control 50. To insure that the threshhold velocity is not sensed on the initial rise of velocity of the screw on the injection stroke, a delay may be set in through interrogator 43. As illustrated, until the screw passes a particular set point (well within the stable velocity range), circuit 43 is not activated to supply a signal to comparator 45.

The "zero" velocity section 46 supplies an output when the screw injection stroke is completed. Theoretically, when the screw ceases forward movement, or reaches zero velocity, the mold M is fully packed and material solidified and the injection stroke is completed. Practically speaking, forward velocity does not come to a definite halt. Rather, some nominal amount of movement continues, due to leakage of material, etc. Thus, a "zero" or nominal setting is set in at 48 to supply a nominal value to comparator 47. When the actual screw velocity drops to this low value, comparator 47 supplies an output signal. Preferably, the "zero" velocity signal is passed through a variable timer 49, which may provide a further preset delay, to any zero velocity signal. The zero velocity signal is supplied to the FBM (back pressure control 15) to switch off the hold pressure. The signal is also supplied to the shot volume control 60 to give a position indication of the completion of the injection stroke.

A primary function of the velocity range monitor 40 is to direct the shifting of the pressure produced by injecting screw 6 from the high injection pressures to holding pressure, sequentially, in the requisite time frame. In conventional approaches to molding it will be recognized that these various events of pressure shifting from injection to hold, then to cure pressure settings, were arrived at through trial and error time settings with no feed back of the specific process events which were, in fact, occurring in the injection molding process. It is the function of the velocity range monitor 40 to recognize the occurrence of such events as "mold full", then direct the subsequent pressure shift to the holding pressure. The monitor then notes "mold seal" or solidification of the material at the nozzle 22, and directs the next desired pressure shift and subsequently directs the return of the ram and mixing screw to its proper return position.

Figure 2A:
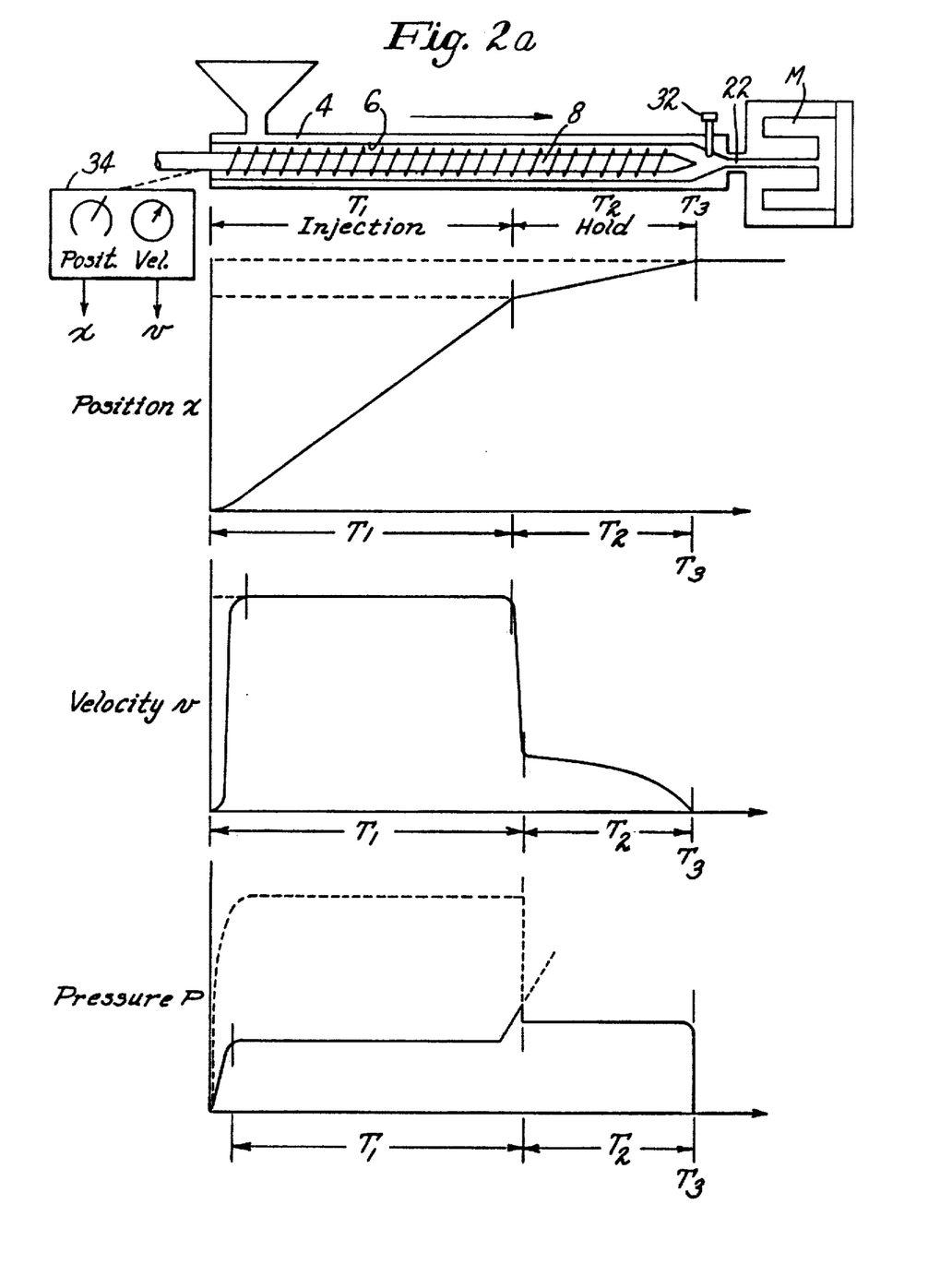
FIG. 2a is a graphic representation of position, velocity and pressure pattern with respect to time during injection molding.

In the performance of its function the velocity range monitor operates in conjunction with the position transducer 34 (FIG. 1). As seen in FIG. 2a as the plastic material is packed into the mold in the filling process, the ram or screw moves forward, at a velocity (at time T1) initiated in the back pressure control means 15 and under the general control of the integrated FBC. As the material is packed into the mold and it "fills", the injection ram velocity drops from the set value to a lower value due to the reduced flow (as shown at T2) of plastic material. The change in velocity may be noted to signal the "mold full" event, which then may be used to initiate a shift in pressure for the subsequent function.

FIG. 2a illustrates the pressure/position relationship of the injection stroke. The "mold full" event thus signals the appropriateness of the shift from the relatively high injection pressure to the more nominal holding pressure utilized during the solidification stage. It should be appreciated that the more quickly the "mold full" condition can be recognized, the more quickly and smoothly the shift from injection pressure to holding pressure may be effected. This prompt and smooth shift materially reduces or avoids the problem of flashing.

After the holding pressure is established, there is some continuing creep or movement of the screw 8 as the plastic material within the mold cools and shrinks. It is recognized that when solidification is complete at time T3, shrinkage is complete and movement of the screw 8 ceases.

If desired, a holding timer may be included to introduce a predetermined elapsed time between "zero velocity" and reduction of hold pressure to provide for additional curing of the molded part prior to its ejection from the machine and initiation of the next injection shot. It has been determined in certain operations that this additional hold time is desired subsequent to the occurrence of "zero velocity" to enhance certain properties of a molded product.

Melt Temperature Control—Achieving a desired melt temperature and maintaining that temperature within enclosed limits once it has been reached is an important aspect of injection molding control. The control diagrammed in FIG. 3 performs in accordance with the invention as subsequently described. The fast response of plastic temperature to a change in command as well as the uniformity of temperature distribution within the melt are essential characteristics of such a control system. To achieve these characteristics the invented control adopts a priority sequence whereby the conversion of the mechanical energy to heat within the melt is utilized as much as possible in preference to conductive heat from the barrel heaters. The control also attempts to maintain as nearly an adiabatic condition as practical within the barrel/melt chamber 6 by keeping the barrel zone heaters 24 at the selected melt temperatures. This approach minimizes heat flow from the heaters into the melt itself and thus minimizes temperature gradient in the transverse direction of the barrel.

Figure 3:
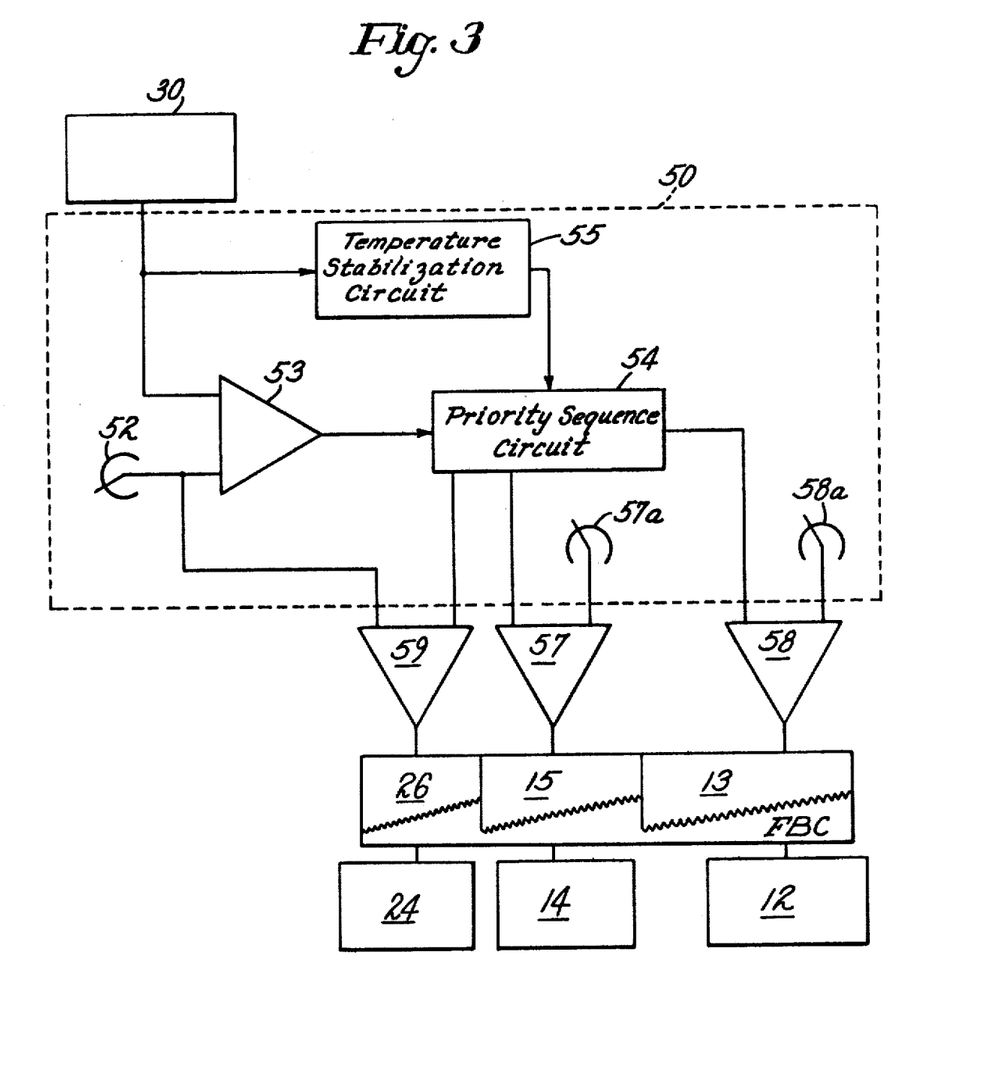
FIG. 3 is a functional diagram of the melt temperature control of the invention.

The three process parameters which contribute toward the generation of melt temperature in the injection molding machine are: the barrel temperature, the back pressure on the plasticating screw, and the screw speed. For every material which is injection molded there are initial values of these three parameters, which, on the basis of past experience, are felt capable of producing an acceptable product. In order to adjust the process parameters, however, in the event that the molded part fails to come up to the required standards or the temperature strays from the preset value due to environmental changes, each of these parameters must be coordinately controlled so that the melt to be injected is restored to its proper temperature or adjusted to a different temperature felt to be more satisfactory. In order to effect this control of melt temperature each of the three parameters controlled by the melt temperature control 50 within the circuitry is adjustable by a nominal error setting, which for the purposes of this application will be designated a delta ($\Delta$) setting.

Referring now to FIG. 3, the melt temperature control 50 subsystem is shown in block diagram form. Primary input to the control 50 comes from the melt temperature transducer 30 which, in FIG. 1, is located in the nozzle area 22 of the melt chamber 6. A second input to the melt temperature control 50 is the melt temperature set point 52. This value is the selected temperature for the melt to be injected and is also the nominal setting for the barrel temperature of the injection molding machine. As illustrated in the diagram, this set point input is conveniently a potentiometer or variable resistance device within a voltage circuit such that a calibrated voltage is produced and which may be fed into the control 50 and utilized therein. The inputs from melt temperature transducer 30 and melt temperature set point 52 are supplied to amplifier means 53 capable of generating a voltage signal directly proportional to the difference between the two input temperatures. This error signal is supplied to further amplifier means 54 herein labeled Priority Sequence Circuit. The priority circuit 54 studies the error signal and generates the previously mentioned delta signal to be supplied back to one of three subcircuits for the three previously mentioned parameters, which subcircuits effect the control and adjustment of the three previously mentioned parameters through the FBC and barrel temperature control 26 to establish the new melt temperature. Thus, the priority sequence circuit selectively activates: (1) amplifier means 57 to provide a control signal for the injection molding machine back pressure means 15; (2) amplifier 58 to supply a control signal to screw speed control means 13; or (3) amplifier means 59 to supply a control signal to the barrel heaters control 26. Screw back pressure set point 57a and screw speed set point 58a represent inputs of initial values of screw pressure and speed, anticipated to give a satisfactory melt temperature. A temperature stabilization circuit 55 is disposed between melt temperature transducer 30 and priority sequence 54. The function of this circuit 55 is to insure that control signals are not generated and supplied erroneously to the heater control 26 or back pressure control 15 or screw speed control 13 when the melt temperature is in a transient state. Stabilization circuit 55 disengages the function of the priority sequence circuit 54 at such times as when the melt temperature sensed by the transducer 30 is varying or changing. The melt temperature control 50 may be used individually to be directly coupled to the various related elements of the basic control system FBC. In the preferred embodiment illustrated, the melt temperature control 50 provides its signals to a portion of the overall FBC a portion of which is the previously mentioned coordinate control available from the General Electric Company, Salem, Va., as PM-1000. This control serves to collect several such control subsystem signals and supply a final control system signal to the basic control elements within the system FBC.

In operation, the melt temperature control circuit at 50 may respond either to direct input from a manual operator or from a sophisticated sensor system having the capability of determining an appropriate melt temperature. Assuming an actual melt temperature lower than a determined melt temperature, an operator or a related FPC or FMC control may initiate a signal to readjust the melt temperature set point 52. The device at 52 might be a manually set potentiometer or a servo control driven by an outside control as from the FMC. The new melt temperature set point is supplied directly to amplifier 59 and thus the barrel controls 26, to cause the barrel heaters 24 to go immediately to the new set point temperature. If the change between old and new melt set temperature points is quite small, the adjustment of barrel heat to the new set point may be sufficient to raise the melt temperature to the desired value. If the temperature difference is more significant, raising the barrel heat to set point may not result in sufficient heat to bring the plastic up to the desired temperature. When the melt temperature is stabilized and a difference or error signal exists between set point 52 temperature and melt temperature as taken by transducer 30, a control signal will be produced from amplifier 53 to raise the melt temperature toward the desired value. As previously mentioned whenever the error signal exists, a delta value is generated by the priority sequence circuit 54 to effect an increase in melt temperature. We have found a particular sequence of effecting the changes in the three parameters significantly more effective than other methods. According to the logic chosen for the priority sequence circuit 54, when a positive error exists between the melt temperature set point and the actual temperature, the screw speed will first be increased so as to decrease the error. The screw speed will be continually increased so long as an error exists, until the preset limit of screw speed is reached. This limit may be a process limitation imposed by a particular material or it may be an output limitation upon the injection molding machine itself such as upon the screw motor 12.

If the temperature error still exists upon reaching the screw speed limit, the screw back pressure will be proportionately increased in stepwise fashion until the preset limit of the back pressure is reached. If, after maximizing the back pressure, an error in the original direction still persists, the barrel heat set points 52 will be increased beyond the adiabatic level to provide a positive input of heat energy from the barrel heaters 24.

As was previously mentioned the screw speed is incrementally raised by the delta value in a stepwise fashion. The temperature stabilization circuit 55 prevents a new delta value being added to screw speed by circuit 54 until the previous value has had an effect on melt temperature and (the melt temperature) has, in fact, stabilized at the new level. When the stabilization circuit 55 senses the stable melt temperature and the differential amplifier 53 notes a continuing difference between the melt temperature and set point 52, the priority sequence circuit 54 will be enabled to generate a delta value once again to raise the screw speed by the proportional amount. Preferably, melting cycles will be repeated with further changes in screw speed inhibited until two successive cycles yield no significant melt temperature change. If after this stabilization the desired melt temperature has not been achieved, the screw speed will be incremented further by the delta value and stabilization allowed to reoccur.

If the upper limit of screw speed is reached and the temperature is still too low, the screw back pressure will be automatically incremented by the priority sequence circuit 54. Very likely the desired melt temperature will be attained before the preset limit of the back pressure is reached. It will be noted that the increase in back pressure is effected similarly to that of the increase in screw speed. A delta value is assigned by circuit 57 and inserted into the back pressure control 15 with further changes in back pressure inhibited until two successive cycles of no significant temperature change, i.e., stabilization. If the desired melt temperature is not attained before reaching the preset limits of back pressure, the barrel heater set points will be increased beyond the melt temperature set point 52 incrementally according to the delta values, after stabilization of any previous input, to effect the change in temperature. This incremental increase in barrel heater set point value will occur until the melt temperature is satisfied or the limit of barrel heater set points is reached. It is to be noted that, preferably, the temperature is sampled for each shot immediately after injection, in the nozzle area, so that the frictional effects of the plastic flow through the nozzle 22 will also be taken into account. In many cases significant effect exists in the nozzle area and which may have a substantial effect upon actual temperature of plastic entering mold M. Thus, it is desirable to place melt temperature transducer 30 in a position to record this effect and, further, to sample the melt temperature at a point in time in order to observe this frictional effect.

The specific sequence of adjustment of parameters in order to lower the melt temperature is supplied by priority sequence circuit 54. According to our invention the steps in lowering the melt temperature are generally the reverse of those followed for raising the melt temperature. When a command is given to lower the melt temperature the barrel heaters 24 will again be set to the new desired level by inputting the new melt temperature at set point 52. After stabilization is allowed to occur, the back pressure will be decremented until the temperature error is reduced to zero or the lower limit of the back pressure has been reached. By way of explanation, this lower limited back pressure is generally a nominal value for any given material in a general melt temperature injection range. Some nominal back pressure on screw 8 is required in order to effect plastification of the material prior to injection. If the lower limit of back pressure is reached prior to reaching the desired melt temperature the screw speed then is incrementally lowered.

If the melt temperature is still low enough when the screw speed reached its lower practical limit, the barrel heater set points will be lowered below the melt temperature setting at 52. It will be only under extreme conditions or very limited allowable ranges of screw speed and back pressure that the barrel heater set point will have to deviate materially from the melt temperature set point 52. Therefore, in general, it can be assumed that the desired adiabatic condition will be prevalent since the predominant energy source is mechanical, coming from the combination of the action of screw 8 and back pressure thereon.

The response to accomplish change in melt temperature by the method of the invention is quite fast and, resultingly, the number of cycles required for stabilization is minimized. This is effected primarily because of the particular sequence we have chosen to effect these melt temperature change and control. It should be noted from the description of the operation that the control provides for maximum screw speed wherever feasible. This principle results in optimum recovery time and correspondingly maximizes the practical production rate. As was previously mentioned, it is desirable to sample the melt temperature immediately after injection so that the frictional effects may be taken into account. This is accomplished by coupling the melt temperature control 50 to the velocity range monitor control (see FIG. 2). In this manner the melt temperature measurement may take place upon the initiation of the velocity range monitor at the instant final friction is established.

Figure 4:
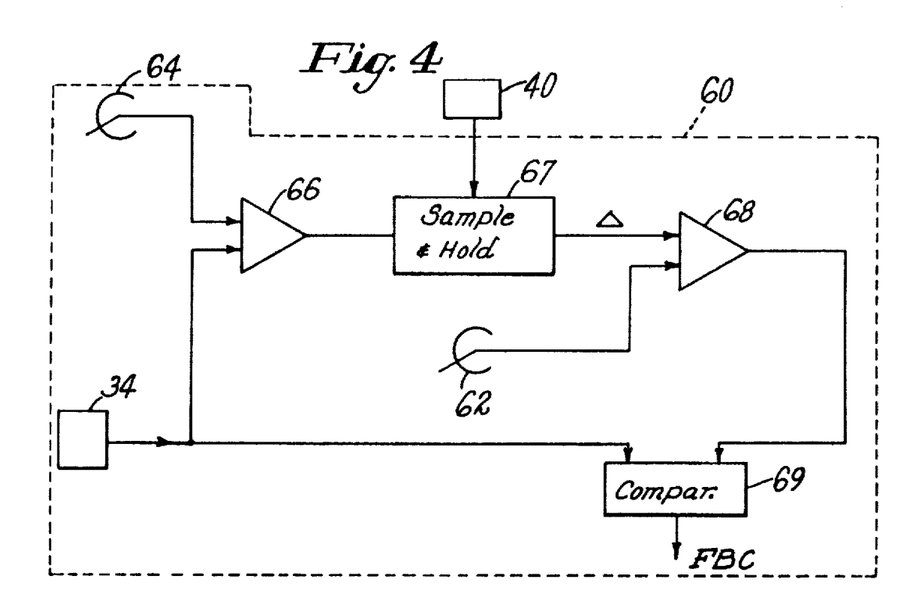
FIG. 4 is a functional diagram of the shot volume control of the invention.

Shot Volume Control—Referring now to FIG. 4, the block diagram of the shot volume control subsystem 60 is illustrated. Initial values are set into the control to establish the nominal value of the screw back or recharge position. This value is set into the screw back positon set point 62 and may be a variable potentiometer or other device for supplying a calibrated voltage signal. Thus, upon completion of an injection molding cycle and when so cycled by the controller, as the screw 8 and chamber 6 fill, and the screw retracts back during the plasticating operation, it will so track until it reaches a position corresponding to the value set into the screw back position set point 62.

A desired final cushion size is established by setting a corresponding screw position into the control at final cushion size set point 64. This element is also a device capable of supplying a calibrated voltage signal. The input of this value establishes the desired forwardmost tracking position of the screw 8 during the injection stroke. A cushion is deliberately set in so that the screw does not bottom out against the nozzle area 22 on the injection stroke. This ensures that there will be adequate material available in the chamber to fill the mold prior to bottoming out. As the injection stroke is initiated, the position transducer 34 feeds information to the shot volume control 60, to differential amplifier 66. Amplifier 66 supplies an output indicative of the difference of cushion set point 64 and screw position 34 to a sample hold circuit 67. When zero velocity is detected at the end of the stroke by the velocity range monitor 40, the zero velocity signal from the velocity range monitor activates circuit 67 which samples the error in final screw position as determined by amplifier 66. This error is stored in memory means in circuit 67. This increment or decrement of error is then used to offset the screw back position set point 62 through amplifier 68 which supplies a new (corrected) screw back position to comparator 69. Thus, when screw 8 recharges, it tracks back until the position as signaled by transducer 34 matches the new recharge position as supplied by amplifier 68 and determined by comparator 69. Comparator 69 then signals the FBC that the screw 8 is ready for another shot. If screw 8 stops prior to desired final cushion set point because the mold then is full, the screw recharge position value will be readjusted. The control will reset so that the total shot size is lessened and the screw 8 returned to a position short of the originally set position. If the ram passes the indicated final cushion set point approaching a bottoming out, a positive error signal will be developed. Upon comparison will the actual final cushion set point and the desired final cushion set point, a delta signal is generated which will drive the screw recharge position in a direction to enlarge the shot size. As with the previous subsystem, the shot volume control 60 relies upon the velocity range monitor 40 control to determine the regions of the velocity curves (FIG. 2a) such that "zero" velocity and "mold full" positions are identified. The shot volume control may then make its observations at these particular process events and thus readjust and recalculate shot volume size accurately.

This shot volume control subsystem ensures a desired preset cushion independent of changes in plastics temperatures and pressures and leakage of the screw or non-return check valve during injection. A conventional fixed screw back incorporating a limit switch determined set point would not take these factors into account. The effect in general, in conventional systems with position limit switches is a drift of final forward screw position either toward the mold (culminating in bottoming out) or away from the mold resulting in an excessive cushion.

Too little or no cushion may be accompanied by insufficient cavity pressure during curing within attendant inconsistency and part weight or size. Too large a cushion may result in a relatively large inventory of material that must be subjected to an additional heating cycle and corresponding possible degradation. Also excessive packing may occur with a large cushion, causing flashing especially in the case of thin wall parts. The philosophy of the newly invented control is to detect the actual final forward screw position at the end of the molding cycle and compare it with the desired preset forward position. If a difference exists the screw back positions (i.e., the return and melt decompression points) of the subsequent shot will be automatically reset by an amount that will tend to reduce the error difference to zero.

Figure 5:
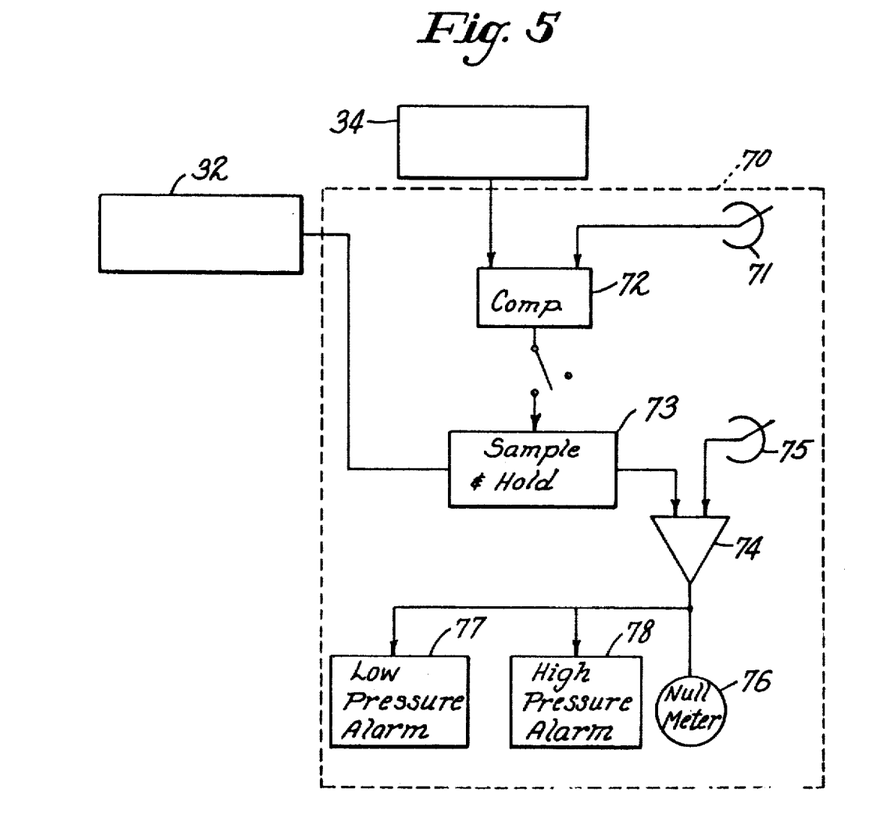
FIG. 5 is a functional diagram of the pressure monitor control of the invention.

Pressure Monitoring System—Referring now to FIG. 5 a block diagram of the pressure monitoring system 70 is illustrated. Screw position transducer 34 provides an input of screw 6 position during the injection stroke. A designated position where sampling is to occur is input through set point 71. These inputs are supplied to a comparator 72 which outputs a signal to a sample and hold circuit 73. Circuit 73 is capable of sampling a pressure from transducer 32 and holding the value for later reference. At a preselected sample position, the pressure signal is released to differential amplifier 74 where it is compared with a preselected ideal pressure signal supplied from set point 75. Amplifier may supply various monitors and alarms as null meter 76 or bells or lights 77 and 73 which may signal an out of tolerance condition.

A correlation may be generally found between repetitively successful injection shots and the injection pressure required to fill the mold. The pressure monitor system automatically samples the pressure at a preselected position of the screw during injection stroke and compares it with a set point. If the difference between the set point and actual pressure exceeds a preselected range, an alarm means may be actuated. This may be in form of a bell, a light or both, singly or in conjunction with a direct feed back to the injection stroke controller. This will warn the controller (operator or automatic control) that conditions have changed as by different melt or mold temperature or possibly by obstructions in the path flow, to the extent that product qualities have been or will be affected. This range is preferably set by adjustable upper and lower limit potentiometers. These limits as well as the set point itself are typically dictated by experience. Parts with critical dimensional tolerances will require a relatively narrow range of allowable dynamic injection pressure. The point at which this pressure is sampled is adjustable to allow optimum correlation. To implement this feature a pressure transducer may be added to the injection hydraulic line and a positioned sensor such as a portion of the velocity range monitor control is utilized. In lieu of the position transducer in the injection hydraulic line, a sensor 34 in the mold nozzle or portion of the flow path may be utilized, as illustrated.

Figure 6:
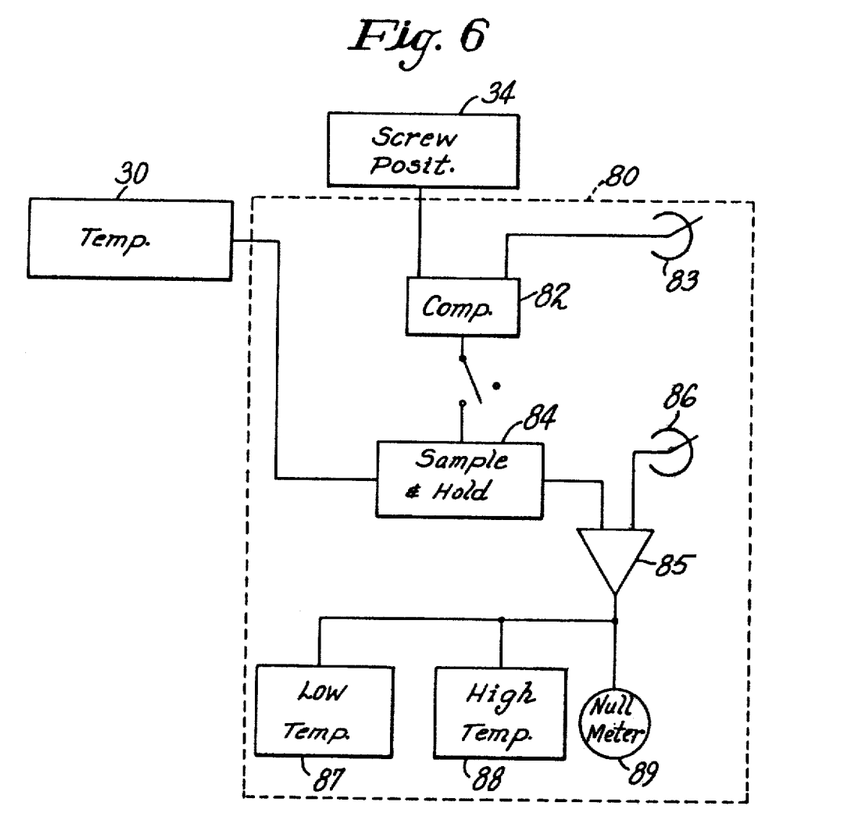
FIG. 6 is a functional diagram of the temperature monitor control of the invention.

Melt Temperature Monitoring System—Referring now to FIG. 6, a block diagram of the melt temperature monitoring system is illustrated.

It will be appreciated that the organization of the melt temperature monitoring system 80 is similar to the pressure monitor system 70 (FIG. 5). A comparator 82 receives inputs from the screw position transducer 34 and a preset sample position set point 83. The comparator 82 supplies an output, when the inputs match, to a sample and hold circuit 84. Circuit 84 also receives a temperature input from transducer 30. Sample and hold circuit 84 retains the sampled temperature and also supplies a calibrated signal indicative thereof to a differential amplifier 85. Amplifier 85 compares the sampled temperature with a preselected ideal temperature input from set point 86. Amplifier 85 may output to various alarms 87, 88 and indicator or null meter 89 giving an indication of whether or not the sampled values are within the preselected tolerances.

As with injection pressure, it has been generally found that a correlation exists between melt temperature and satisfactorily movable parts. In the preferred embodiment, a monitoring system is illustrated which automatically samples the melt temperature at the time the final cushion is established. This monitoring system depends upon the velocity range monitor control to initiate action. When the screw reaches the final cushion position, as sensed by the zero velocity sensor of the velocity range monitor, that monitor may sample the temperature at the temperature transducer 30 and compare it to the set point. An alternative system, as shown in FIG. 6, provides a positive monitor of melt temperature. If a difference exceeds a preselected range as determined by alarms 87 and 88 a light or bell may be actuated. The controller will be alerted that conditions have changed and the process to cause a melt temperature difference. If the melt temperature control subsystem 50 is active it will, in time, effect a correction of the melt temperature. However, with the additional feature of the monitor 80, an operator has the opportunity to manually reset the temperature set points to effect a quicker adjustment of the melt temperature.

While certain embodiments of the method of our invention have been shown and described, it will be apparent that other adaptations and modifications may be made without departing from the scope of the following claims.

I claim:

1. A control for the temperature of plastic melt within an injection molding machine having a barrel, heating means for heating said barrel, a screw within said barrel, motor means for rotating the screw and means for applying pressure to said screw in a direction along its longitudinal axis whereby said screw acts as a piston comprising:

a. a first control means connected to said heating means for controlling the amount of heat supplied to said barrel by said heating means;

b. a second control means connected to said motor means for varying the rotational speed of said screw;

c. a third control means connected to said means for applying pressure to said screw for varying the amount of pressure applied to said screw; and d. means interconnecting said first, second and third control means for rendering said control means selectively operable whereby the temperature of the plastic melt is maintained within predetermined limits.

2. A system for the adaptive control of a machine for injecting plasticated material into a mold, said machine having a heated barrel connected to the mold by a nozzle, means for inserting material into the barrel, a plasticating screw rotatably and slidably mounted in the barrel, and means to, first, rotate and retract the screw in order to plasticate the material and collect an amount thereof in front of the screw and, second, to force the plasticated material into the mold by a forward sliding thrust of the screw between charged and final positions, said system comprising:

A. a monitor for detecting the temperature of the plasticated material and generating a signal relative thereto;

B. means for setting a predetermined standard for the temperature of the plasticated material and generating a single relative thereto;

C. means for receiving and comparing the temperature monitor signal with the standard temperature signal, and generating a signal relative to the difference therein;

D. a first regulator for adjusting the rotating speed of the screw during plastication;

E. a second regulator for adjusting the sliding force which is applied to the screw during plastication;

F. a third regulator for adjusting the supply of energy to the barrel heaters during plastication; and G. a selector responsive to the temperature differential signal to selectively activate the regulators in a manner which tends to reduce said temperature differential signal to zero, said selector activating the regulators according to a priority sequence which maximizes the input of mechanical energy.

3. A system for the adaptive control of a machine for injecting plasticated material into a mold as described in claim 2 wherein the priority sequence for increasing the temperature of the plasticated material consists of sequentially activating the first, second and third regulators to, first, increase the rotating speed of the screw to obtain, if necessary, maximum compensation therefrom, second, if necessary, increase the sliding force which is applied to the screw during plastication to obtain maximum compensation therefrom, and, third, if necessary, increase the supply of energy to the barrel heaters during plastication to obtain maximum compensation therefrom.

4. A system for the adaptive control of a machine for injecting plasticated material into a mold as described in claim 2 wherein the priority sequence for decreasing the temperature of the plasticated material consists of sequentially activating the first, second and third regulators to, first, decrease the supply of energy to the barrel heaters during plastication to obtain, if necessary, maximum compensation therefrom, second, if necessary, decrease the sliding force which is applied to the screw during plastication to obtain maximum compensation therefrom, and, third, if necessary, decrease the rotating speed of the screw to obtain maximum compensation therefrom.

* * * * *